XR 2,806,155

Sept. 10, 1957 I. ROTKIN 2,806,155

PIEZOELECTRIC CRYSTAL TRAVELING-WAVE TRANSDUCERS

Filed June 9, 1952 2 Sheets-Sheet 1

INVENTOR
ISRAEL ROTKIN

BY Howard L. Rose
AGENT

INVENTOR
ISRAEL ROTKIN

BY Howard L. Rose
AGENT

United States Patent Office 2,806,155

Patented Sept. 10, 1957

2,806,155

PIEZOELECTRIC CRYSTAL TRAVELING-WAVE TRANSDUCERS

Israel Rotkin, Hyattsville, Md., assignor to the United States of America as represented by the Secretary of Commerce Application July 9, 1952, Serial No. 298,015

6 Claims. (Cl. 310—8.1)

(Granted under Title 35, U. S. Code (1952), sec. 266)

The invention described herein may be manufactured and used by or for the Government of the United States for governmental purposes without the payment to me of any royalty thereon in accordance with the provisions of the Act of March 3, 1883, as amended (45 Stat. 467; 35 U. S. C. 45).

The present invention relates to the art of setting up vibrations and vibratory waves in bodies and in particular to the art of setting up vibrations in bodies by the use of piezoelectric crystals. This invention is an improvement on an invention disclosed in application Serial Number 290,841, filed May 29, 1952 now Patent No. 2,702,472, by Jacob Rabinow.

In the prior art when piezoelectric crystals were used to set up large amplitude vibrations in bodies, the vibrations were built up by a succession of pulses delivered to the crystal at the natural frequency of vibration of the system. This method of setting up vibrations has a serious disadvantage in that the vibrations are limited to a very narrow range of frequencies which are centered about the natural frequency of vibration of the system. This limitation is particularly undesirable in the field of material testing where it is necessary to subject the material under test to wide ranges of vibrational frequencies.

It is the primary object of this invention to provide a system for producing large stresses in bodies by means of piezoelectric crystals, in which system the frequency of vibration is not limited to the natural frequency of the vibrating body.

Another object of this invention is to provide a system of vibrating bodies in which the body may be caused to vibrate over a wide range of frequencies. Such a system may be used for communication as well as for materials testing.

In accordance with the preferred embodiment of the present invention a number of piezoelectric crystals are inserted in a body at spaced intervals along the length of the body. Each piezoelectric crystal is connected in the output of an electronic amplifier and receives its power therefrom. The inputs to the amplifiers are connected at spaced intervals along an electrical delay line and are excited sequentially by means of a signal traveling along this line. The signal sent out by a signal source energizes the first amplifier, which in turn energizes the first piezoelectric crystal. The mechanical disturbance created in the body as a result of energizing the crystal travels in both directions along the body. The electrical signal traveling along the electrical delay line is timed so that the second amplifier and therefore the second piezoelectric crystal is energized at such a time that the disturbance created by the second crystal is added to the vibrations set up in the body by the first crystal; that is, the delay in the delay line between the amplifiers must be such that the electrical signal traveling along the delay line from the first to the second amplifier reaches the second amplifier at such a time that the second crystal stresses the body just when the stress produced by the first crystal has reached that part of the body affected by the second crystal. Any number of piezoelectric crystals may be employed depending upon the amplitude of the vibration desired.

Other uses and advantages of the invention will become apparent upon reference to the specification and drawings.

Figure 1:
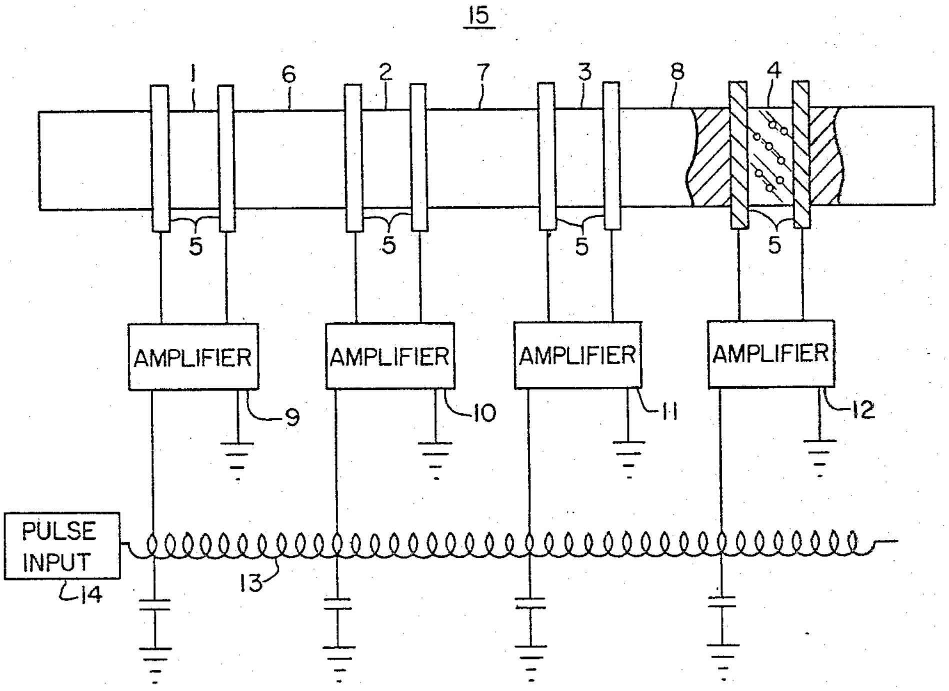
Figure 1 shows an embodiment of the invention in which metal disks are interposed between each end of the crystal and the rod.

Referring to Figure 1, 1, 2, 3, and 4 are piezoelectric crystals which have soldered to each end thereof conducting disks 5. Soldered between the exposed faces of each conducting disk are the segments 6, 7, and 8, which together with the crystals and the conducting disks form the bar 15 which is the body to be vibrated. Associated with the crystals 1, 2, 3, and 4 are the amplifiers 9, 10, 11, and 12, respectively. The output of each amplifier is fed to its associated crystal through conducting disks. The amplifiers are in turn fed by an electrical delay line 13, whose velocity of propagation is almost equal to the velocity of propagation of the mechanical disturbance in the rod 15. The electrical signal is fed into the delay line 13 from the signal source 14.

When a signal is fed simultaneously to the amplifier 9 and the delay line 13, the amplifier amplifies the signal and feeds it to the crystal 1. The current through the crystal creates a longitudinal disturbance in the crystal, which disturbance travels from the crystal through the adjoining segment 6. The time delay in the electrical delay line 13 between the inputs of the amplifiers 9 and 10 has been so chosen that by the time the vibration created in the bar by the crystal 1 has reached the crystal 2, crystal 2 is energized and also sets up a disturbance in the bar which is added to the vibration created by the crystal 1 and therefore intensifies the overall disturbance in the bar. This synchronism need be only approximate to cause the energies to add. This action continues until the crystal 4 has been reached, each crystal adding its disturbance to the total of the disturbances created by the preceding crystals. The vibrations then proceed to the right-hand end of the bar where the energy is made use of by an energy-absorbing device not shown. It will be noted that the proper additive relationship between the disturbances created by the various crystals will be maintained only for those vibrations traveling in the same direction as the controlling signal in the delay line. The pulses from each stage which travel in the opposite direction serve no useful purpose and must ultimately be disposed of. This can be accomplished by putting suitable termination means on the left-hand end of the rod. However, these are not shown in the figure since they are well known in the art.

It can be seen from the above that the frequency of vibration of the bar 15 is independent of its length, it being possible to transmit a large number of disturbances of short wavelength along the bar without the disturbances interfering with each other. The only timing problem involved is concerned with the necessity that each crystal add its disturbance when the sum of previously produced vibrations reaches the place in the rod affected by the crystal in question. The wave shape of the disturbance set up in the rod is controllable, it being possible to vary the shape in accordance with the particular application for which the transducer is to be used.

It should be noted that, since the mechanical stresses in the body occur over the entire length of the body, the resulting heat generated in the system is distributed over a large area and therefore the problem of heat dissipation is greatly minimized.

Although the present invention has been described with respect to a device which sets up longitudinal (compression or tension) modes of vibration in the body, it is apparent that by suitable design and location of the driving crystals other modes of vibration, such as transverse, torsional, or shear modes, may be set up in the body to be vibrated.

Figure 2:
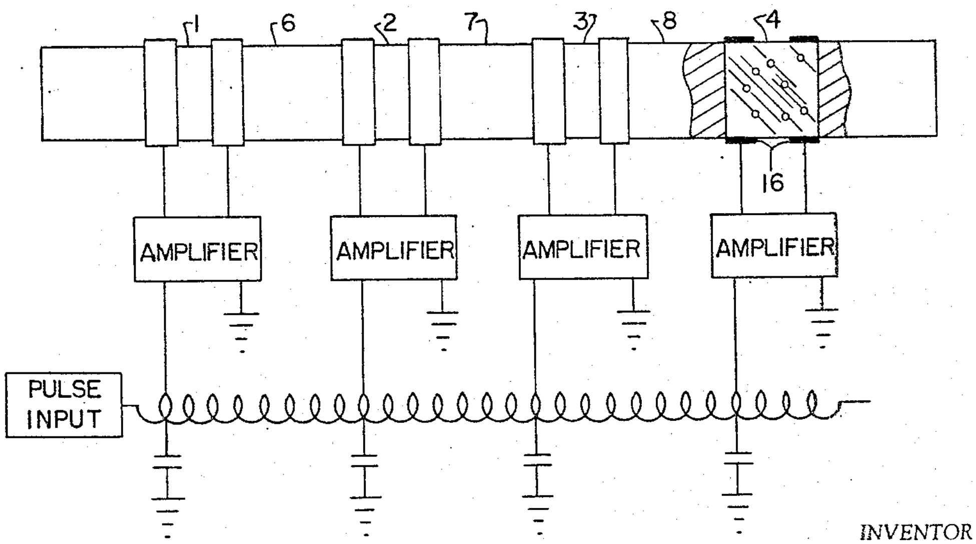
Figure 2 shows another embodiment of the invention in which the metal disks are omitted and in which conducting elements are applied by printed circuit techniques to the outer circumference of the crystal at each end thereof.

Referring to Figure 2, there is shown an embodiment of the invention in which the conducting disks have been eliminated and are replaced by conducting rings 16 which have been applied to the circumference of a continuous rod of a material which is, or may be, made to be piezoelectric. Portions of the rod 1, 2, 3, and 4 between the rings of an exciting pair must be piezoelectric, but the rest of the rod, sections 6, 7, and 8 need not be. The operation of this device is essentially the same as the device shown in Figure 1.

The type of crystal employed is a matter of choice. However, to date barium titanate, which has had a direct current applied to it in order to give it a piezoelectric property, has been found most suitable.

Figure 3:
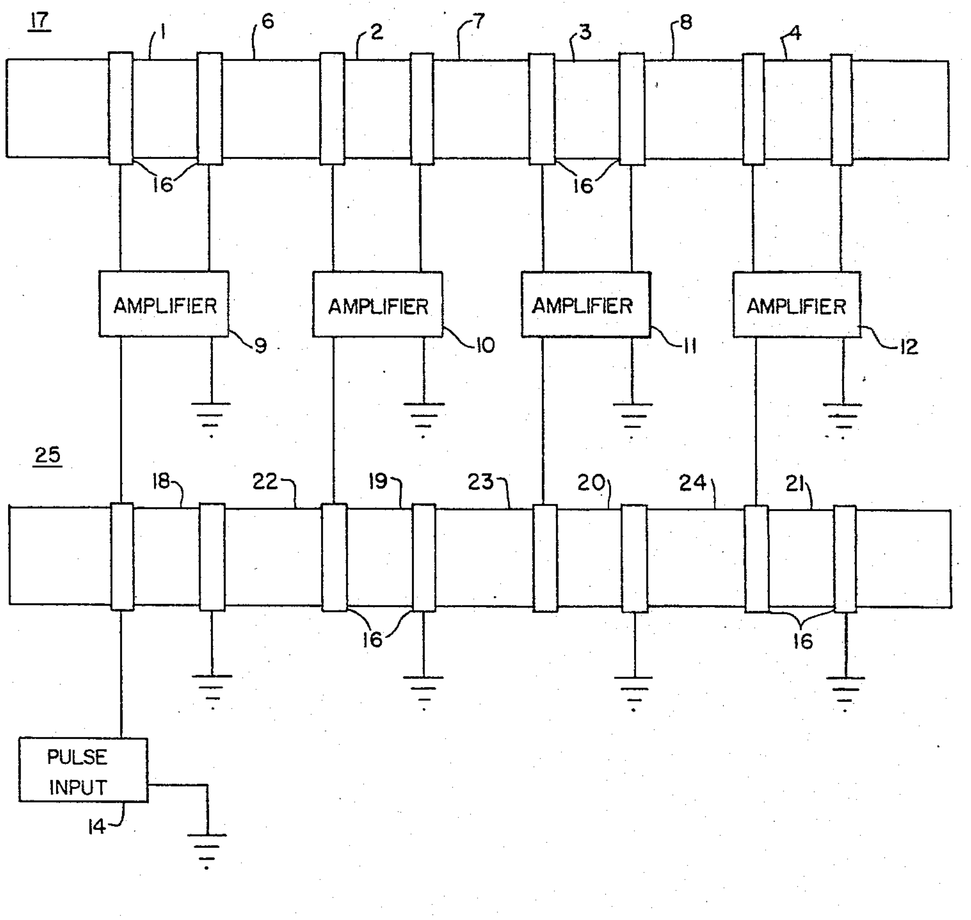
Figure 3 shows another embodiment of the present invention in which the delay line takes the form of a rod of the same type as the rod in which the vibrations are to be induced.

In Figure 3 there is shown an embodiment of the invention using a rod 25 having the same propagation characteristics as rod 17. Rod 25 is made up of piezoelectric crystals 18, 19, 20, and 21, having spaced between them the segments 22, 23, and 24. The segments 22, 23, and 24 are made of the same material as the segments 6, 7, and 8 of rod 15. It is not absolutely necessary that these segments be of the same material as those of the rod 17; however, they must have the same propagation velocity. The output of each of the crystals 18, 19, 20, and 21 is connected to the input of its associated amplifier 9, 10, 11, and 12. When a signal is fed from a source 14 to the crystal 18, a mechanical disturbance is created in the crystal 18 which is transmitted to the segment 22. At the same time a signal is fed to the crystal 18, it is put into the amplifier 9, the output of which energizes the crystal 1 and sets up a disturbance in the segment 6 which travels towards the crystal 2. The disturbance set up in the segment 22 travels through the segment and vibrates the crystal 19. The voltage induced by this vibration in the crystal 19 is fed into the amplifier 10 which in turn energizes the crystal 2. This operation continues until crystal 4 has been energized. It can be seen from the above that when the rod 25 has nearly the same delay per section as the rod 17, the vibrations induced by the crystals 2, 3, and 4 will occur at such time as to reinforce the vibrations induced in the rod by the preceding crystals. While the obvious way to obtain matched time delays in the rods 17 and 25 is to use rods with equal propagation velocities, equal delays per section can also be obtained for rods of unequal propagation velocities by suitably proportioning the lengths of the sections.

Other uses and advantages of the invention will become apparent upon reference to the specification and drawings.

I claim:

1. A device for the generation of mechanical disturbances, comprising a body in which disturbances are to be induced, a plurality of piezoelectric crystal transducers inserted in said body at spaced intervals along the length of said body, means for energizing said crystal transducers comprising a source of electrical energy, means coupling said source to one of said piezoelectric crystal transducers to initiate a mechanical disturbance in said body, and means coupling said source to each of the other crystal transducers in sequence at respective time periods following the energization of said one transducer corresponding to the period of travel of said mechanical disturbance through said body between adjacent transducers.

2. A device for the generation of traveling waves comprising a body in which traveling waves are to be induced, a plurality of piezoelectric crystals inserted in said body at spaced intervals along the length of said body, means connected with each of said piezoelectric crystals for energizing said crystals, and delay means connected between each of said energizing means, the time delay in each of said delay means being almost equal to the time of travel of said mechanical disturbances between the piezoelectric crystals with which each of said delay means is associated.

3. A device for producing mechanical vibrations, comprising a body in which vibrations are to be induced, a plurality of piezoelectric crystals inserted in said body at spaced intervals along the length of said body, an amplifier connected with each of said piezoelectric crystals for energizing said crystals, means comprising one of said amplifiers for energizing one of said piezoelectric crystals to initiate a vibration in said body and means comprising the remainder of said amplifiers and time delay means connected between the inputs of said amplifiers for energizing others of said piezoelectric crystals at such time that the vibrations induced by these crystals reinforce said vibration as it is passing these last-mentioned crystals.

4. A device for the generation of traveling waves, comprising a body in which traveling waves are to be induced, a plurality of piezoelectric crystals inserted in said body at spaced intervals along the length of said body, an amplifier connected with each of said piezoelectric crystals for energizing said crystals, a delay line connected between the inputs to each of said amplifiers, the propagation velocity of said delay line being such that the mechanical disturbances induced by each of said piezoelectric crystals reinforce said traveling waves as they are passing each of said crystals.

5. A device for the generation of traveling waves comprising a body in which traveling waves are to be induced, a plurality of piezoelectric crystals inserted in said body at spaced intervals along the length of said body, an amplifier associated with each of the piezoelectric crystals, said piezoelectric crystal being connected in the output of its associated amplifier, and an electrical delay line connected between the inputs of each of said amplifiers, the propagation velocity of said delay line being matched to the progagation velocity of the traveling waves between the piezoelectric crystals with which the delay line is associated.

6. A device for the generation of traveling waves, comprising a body in which traveling waves are to be induced, a plurality of piezoelectric crystals inserted in said body at spaced intervals along the length of said body, an amplifier associated with each of the crystals, each of said piezoelectric crystals being connected in the output of its associated amplifier, and an auxiliary body similar in construction to the body in which the said traveling waves are to be induced, having one piezoelectric crystal connected to the input of each amplifier, the delay per section of said auxiliary body being matched to that of the traveling waves between the piezoelectric crystals in said first body.

References Cited in the file of this patent

UNITED STATES PATENTS

| | | |
|---|---|---|
| 1,629,100 | Hartley | May 17, 1927 |
| 1,955,471 | Pooler | Apr. 17, 1934 |